Oct. 8, 1935.  C. H. WAGNER  2,016,468
TRAILER VEHICLE SUPPORT AND LOCKING MEANS THEREFOR
Filed July 18, 1932
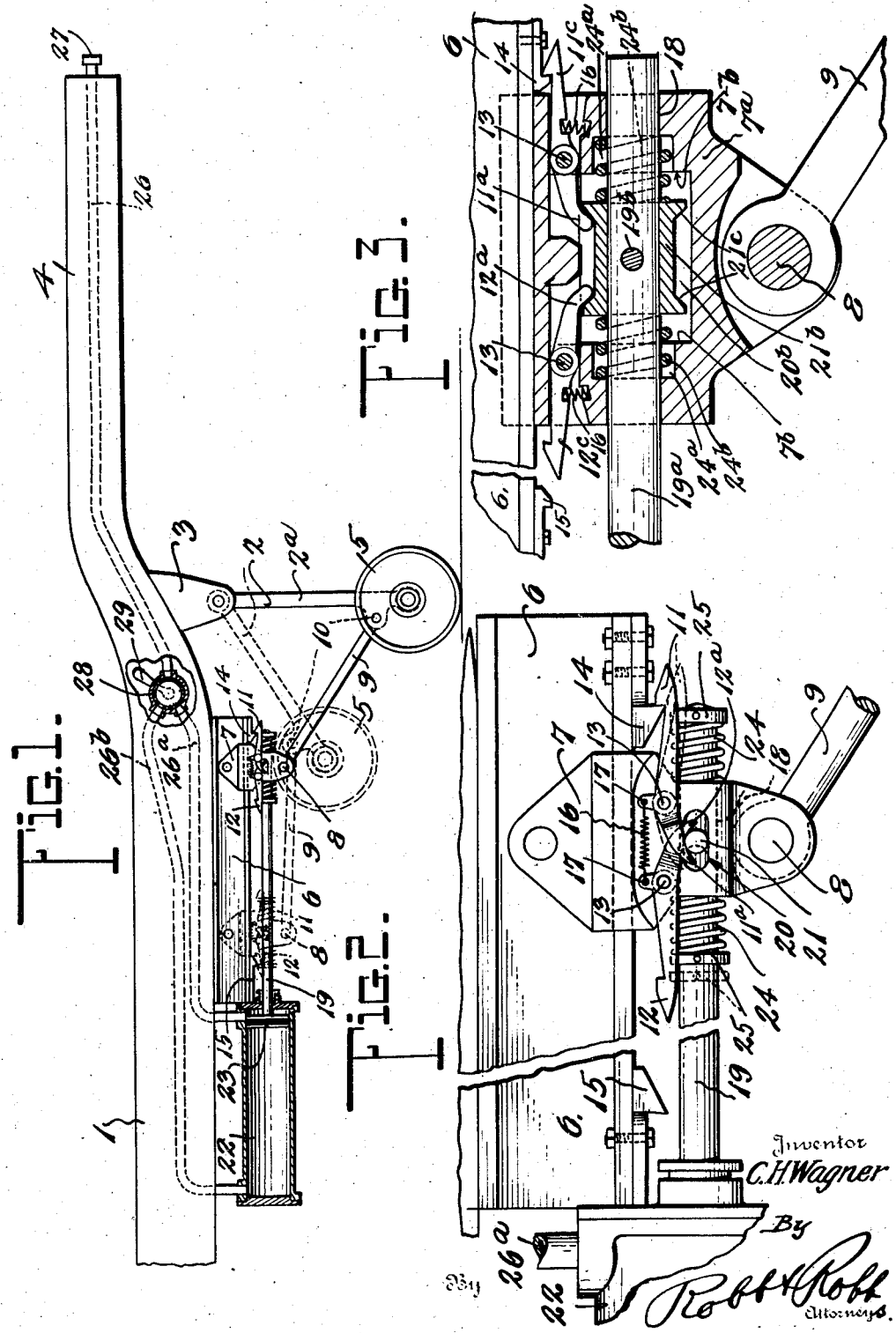
Inventor
C. H. Wagner
By
Robt H Robb
Attorneys.

UNITED STATES PATENT OFFICE 2,016,468

TRAILER VEHICLE SUPPORT AND LOCKING MEANS THEREFOR

Charles H. Wagner, Washington, D. C., assignor to The Highway Trailer Company, Edgerton, Wis.

Application July 18, 1932, Serial No. 623,233

10 Claims. (Cl. 280—33.1)

This invention relates to trailer vehicles and more particularly to supporting mechanism therefor and apparatus for locking the supporting mechanism in its operative and inoperative position and releasing the same from said position.

An object of this invention is to provide means for shifting the supporting elements or legs of the trailer vehicle to and from operative position and providing means for automatically locking supporting elements in their operative position and utilizing the shifting mechanism as the releasing means for the locking means.

Another object is the provision of power operated shifting means for moving the supporting elements of the trailer to supporting positions together with locking means automatically operable when the supporting elements have been so moved, to positively hold the elements in said position together with means for releasing the locking means incident to movement of the shifting means.

A further object is to provide a supporting mechanism for trailers shiftable to and from supporting position and locking means engageable with said supporting means to hold the same in trailer supporting and inoperative position and power operated actuating means for shifting the supporting mechanism to said positions, said actuating means being movably connected to said supporting mechanism and shiftable preliminarily to release said locking means and secondarily to move said supporting means.

A still further object is the provision of a combined actuating and locking means for trailer supports in which the actuating means is shiftable to automatically preliminarily release said locking means to permit the support to be shifted and secondarily shiftable to move the support to or from trailer supporting position.

Another object is the provision in trailer vehicles of pivoted leg supports and pneumatic means for shifting said support to and from its supporting position, together with lock means engageable with the support to positively hold the support in either its operative trailer supporting position or in inoperative non-supporting position and an operating piston member operable by said pneumatic means having a yieldable connection with said support and cooperating with said locking means upon movement thereof by said pneumatic means to release said locking means and to subsequently actuate the supporting means.

Other and further objects and advantages of the invention will be hereinafter set forth and the novel features thereof defined by the appended claims.

In the drawing:

Fig. 1 is a side elevation of the forward portion of a trailer vehicle having my invention applied thereto;

Fig. 2 is an enlarged side elevation of certain of the parts shown in Fig. 1, parts being broken away, and locking means being shown in locked position in full lines, and in released position in dotted lines, and Fig. 3 is a longitudinal vertical sectional view of a slightly modified form of my invention.

Like reference characters designate corresponding parts in the several figures of the drawing.

In the drawing 1 indicates a trailer vehicle adapted to be coupled to and uncoupled from a tractor, not shown, and provided with the usual tractor wheels, braking mechanism, etc., not shown, since the same forms no part of this invention.

At the forward end of the trailer vehicle as seen in Fig. 1 is disposed the temporary support 2 comprising the legs 2ª which are pivotally secured at 3ª to the brackets 3 fixed to the trailer frame 4. The legs 2ª are preferably provided with wheels or rollers 5 in order to permit the trailer to be readily moved from place to place when detached from the tractor, and supported by the temporary support aforesaid.

A guide bar 6 is horizontally secured below the frame 4 and has slidably disposed thereon the guide block 7 which has connected thereto at 8 the operating link member or connection 9, the other end of this member 9 being pivotally secured at 10 to the legs or supporting element 2. Latches 11 and 12 are pivoted at 13 to the block 7 and are alternately engageable with the catches or shoulders 14 and 15 carried by the guide bars 6 as seen more clearly in Fig. 2 of the drawing.

The latch 11 when in engagement with the catch or shoulder 14 will positively hold the support 2 in operative trailer supporting position while upon movement of the block to the left hand end of the guide bar 6 the latch 12 will engage the shoulder 15 and positively lock the support in raised or inoperative position as seen in dotted lines in Fig. 1.

In the form seen in Figs. 1 and 2 the latches 11 and 12 are provided with inclined extended overlapping tails 11ª and 12ª constituting release cams as will later be explained. A spring 16 connecting the ears 17 is provided for yieldably maintaining the latches in engaging position.

The block 7 is provided with an opening or bore 18 in which is slidably disposed the operating rod 19 forming the support actuating means and the latch release means for the latches 11 and 12. The block is slotted at 20 to accommodate the pin 21 extending through the operating rod 19. This pin engages the cam portion on the tails 11ª and 12 upon movement of the rod longitudinally within the bore 18 of the block 7.

The pin 21 upon further movement thereof by the rod 19 will engage the end wall thereof and cause the block 7 to be moved on the guide 6 thus actuating the supporting means 2. In order to maintain the pin 21 in approximately the central portion of the slot 20 when a fluid pressure operative mechanism such as the cylinder 22 and piston 23 mechanism is used, as shown in the drawing, and thereby eliminate the "drifting" of the piston 23 and rod 19 after the pressure is cut off, compression springs 24 are interposed between the ends of the block 7 and collars 25 secured on the piston rod actuating member 19. The pressure for moving the piston may be introduced in any suitable manner but I have shown for an example a supply pipe 26 which may be supplied with air from the tractor, through the coupling 27 when the trailer has been coupled thereto.

A suitably disposed control valve 28 having an operating handle 29 is provided for selectively controlling and admitting the pressure fluid to either end of the cylinder 22 as desired.

In the operation of the device reference should be had to Figs. 1 and 2 which disclose the temporary supports in supporting position, and the trailer vehicle detached from the tractor.

The tractor (not shown) is positioned under the forward portion of the frame 4 and connection established through the coupling 27 between the pressure supply on the tractor and the supply pipe 26.

The operator will now move the valve 28 to admit pressure to the forward end of the cylinder 22 through the conduit 26ª moving the piston 23 and rod 19 to the left, which shifts the pin 21 to the left-hand end of slot 20 and simultaneously engaging the tail 12ª of latch 11 rocking the same down out of engagement with the catch shoulder 14. This is the preliminary release movement of the actuating mechanism, after which further movement of the piston will move the guide block 7 to the opposite end of the guide bar 6 whereupon the latch 12 will engage the catch shoulder 15 to positively lock the block at that end of the bar, as shown in dotted lines in Fig. 1, whereupon the legs or temporary supports 2 are positively held in their raised or inoperative position.

If pressure is cut off from the cylinder either due to leakage or the valve being turned to neutral position the springs 24 will centralize the pin 21 in the slot 20 so that accidental displacement of either of the latches thereby is avoided. When it is desired to uncouple the trailer and tractor the valve 28 is first shifted to admit pressure to the left-hand end of the cylinder 22 through pipe 26ᵇ. Preliminary movement of the rod 19 and pin 21 will depress the latch 12 and release the same from catch 15 thus unlocking the block 7. Subsequent movement will move the block 7 toward the right until it engages the catch 14 at which time the latch 11 will again become engaged with the shoulder on catch 14 thus bringing the parts to full line position as shown in the drawing. The supporting elements are now automatically locked in supporting position and the tractor may be uncoupled from the trailer. Upon the uncoupling aforesaid the air pressure will be released due to breakage at the coupling 27, however, the springs 24 will centralize the pin 21 in the slot 20 and resist any movement under these conditions toward the tail 11ª of the latch 11.

Reference to Fig. 3 discloses a slight modification in which the latches, release mechanism, springs, etc., are disposed within the block 7ª. In this form the block 7ª is provided with a central opening 20ᵇ for the reception of a flanged release collar 21ᵇ pinned to the operating rod 19ª as indicated at 19ᵇ.

The block is provided with the bore or guide ways in which the rod is slidably disposed and limited in such movement by the impingement of the ends of the collar 21ᵇ against the vertical walls 7ᵇ.

The collar 21ᵇ is provided with the camming flanges 21ᶜ arranged to engage and rock either of the latches 11ᶜ or 12ᶜ to releasing position depending which direction the rod 19ª is moved. The block 7ª is counter-bored to provide spring recesses 24ª for the compression centralization springs 24ᵇ. The operation of this form is identical with that described in respect to Figs. 1 and 2 and will not therefore be described. In certain forms of construction where there is no tendency of the member 19 to "drift" or accidentally move longitudinally the springs 24 or 24ᵇ may be entirely dispensed with.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a trailer vehicle, supporting means therefor, actuating means for shifting the supporting means to trailer supporting position and to an inoperative non-supporting position, locking means for positively holding said supporting means in operative position and in inoperative position, and means on said actuating means for automatically releasing said locking means preliminary to movement of the supporting means by the actuating means incident to relative movement therebetween.

2. In a supporting mechanism for trailer vehicles, a trailer support and actuating means therefore arranged to be mounted on a trailer, said trailer support being movable by the actuating mechanism to supporting and non-supporting positions, locking mechanism to prevent said movement, said locking means cooperating with the actuating mechanism to be released thereby preliminary to movement of the support by the actuating mechanism from either of said positions.

3. A trailer supporting unit comprising a trailer support movable to trailer supporting position, and to non-supporting position, locking means for holding said support in said positions to prevent accidental displacement thereof, power actuating means for moving the support to and from said positions, and having relative movement with respect to said support, said actuating means cooperating with said locking means to release the same upon relative movement between the actuating means and the support preliminarily to movement of the support by the power actuating means from either of its positions.

4. In a trailer vehicle of the class described, a movable leg supporting structure shiftable to trailer supporting position and to inoperative position, actuating means on the trailer for moving the support from said positions, locking means for holding the support against movement and release means for the locking means carried by the actuating means for releasing the locking means and subsequently moving the support.

5. In a trailer vehicle of the class described, a frame, a support for supporting the trailer when detached from a tractor and movable into an inoperative non-supporting position, power operated actuating mechanism on the trailer for moving the support to and from said supporting position, latch means carried by the actuating mechanism and engageable with a stationary part on the trailer when the support is in operative supporting position to prevent movement thereof and a relatively shiftable part operable by said actuating mechanism to release said latch means upon relative movement of said shiftable part incident to application of power to the actuating mechanism.

6. In a trailer vehicle, a temporary support therefore movably connected thereto, actuating mechanism for moving the support to operative and inoperative positions including a longitudinally movable part and a connection between said part and the support to shift the same incident to movement of said part, latch means carried by said part engageable with a stationary part on the trailer to prevent movement of said part, a second longitudinal movable part having a shiftable connection with the first mentioned longitudinally movable part for moving the first part, said second part being arranged to engage and release said latch means upon the relative shifting between the first and second parts and to move said first part to cause shifting of the support.

7. In a trailer vehicle, a temporary leg support movable to supporting and non-supporting positions, latch means for locking the support in said positions, a pressure cylinder and means operated thereby for releasing said latch means and positively moving said support from said positions.

8. In a trailer vehicle, a temporary leg support movable to supporting and non-supporting positions, latch means for locking the support in said positions, a pressure cylinder and means operated thereby for preliminarily releasing said latch means and subsequently positively moving said support from supporting to non-supporting position and from non-supporting to supporting position.

9. In a trailer vehicle, a temporary leg support movable to supporting and non-supporting position, latch means for locking the support in said positions, a pressure cylinder and means operated thereby for releasing said latch means and positively moving said support from non-supporting to supporting position.

10. In a trailer vehicle, a temporary support therefore, shiftable to and from trailer supporting position, a guide bar on said trailer, a guide block slidable on said bar, latch means preventing the sliding movement aforesaid, an actuating member for positively moving said block to shift the support to supporting position having a relatively shiftable movement therewith, means for releasing said latch means upon the relative movement shift aforesaid and an operating connection between the block and the support.

CHARLES H. WAGNER.